Nov. 30, 1943.  E. B. JESSUP ET AL  2,335,282
CALCULATING MACHINE
Filed July 6, 1940     6 Sheets-Sheet 1
FIG_1_
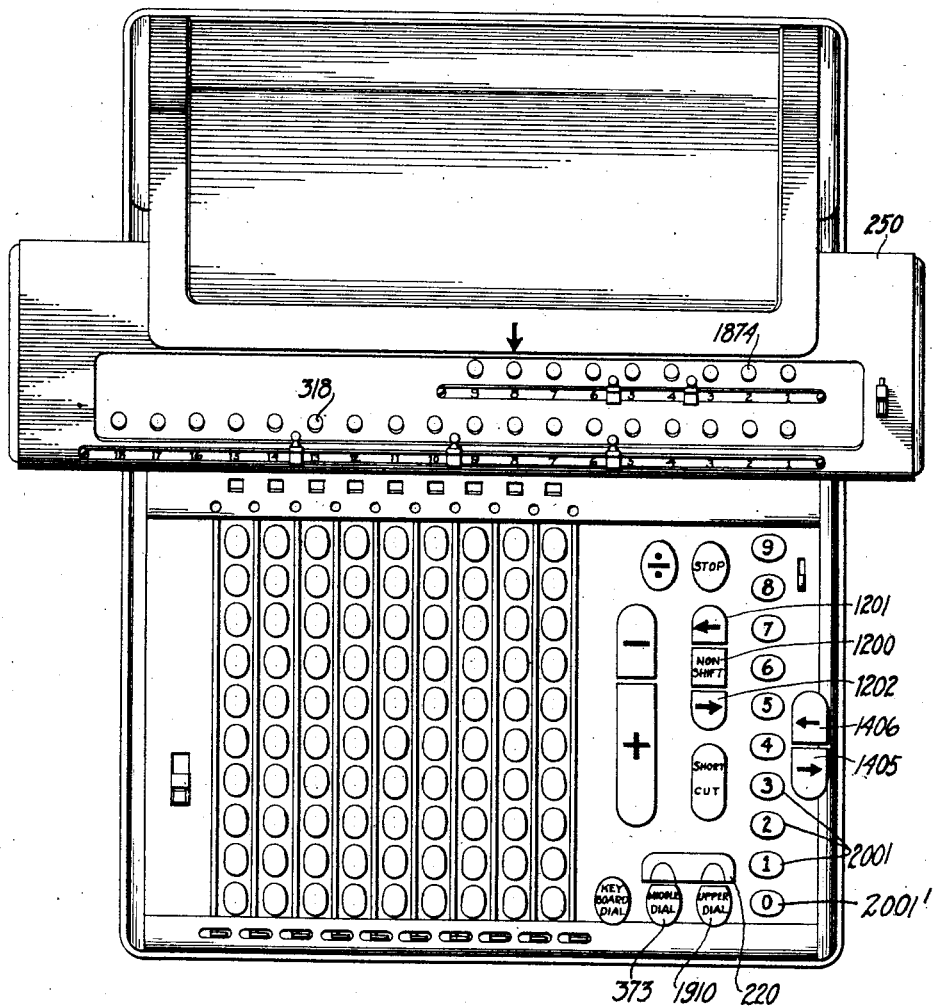
INVENTORS
EDGAR B. JESSUP
HAROLD T. AVERY
BY
Lyon & Lyon   ATTORNEYS

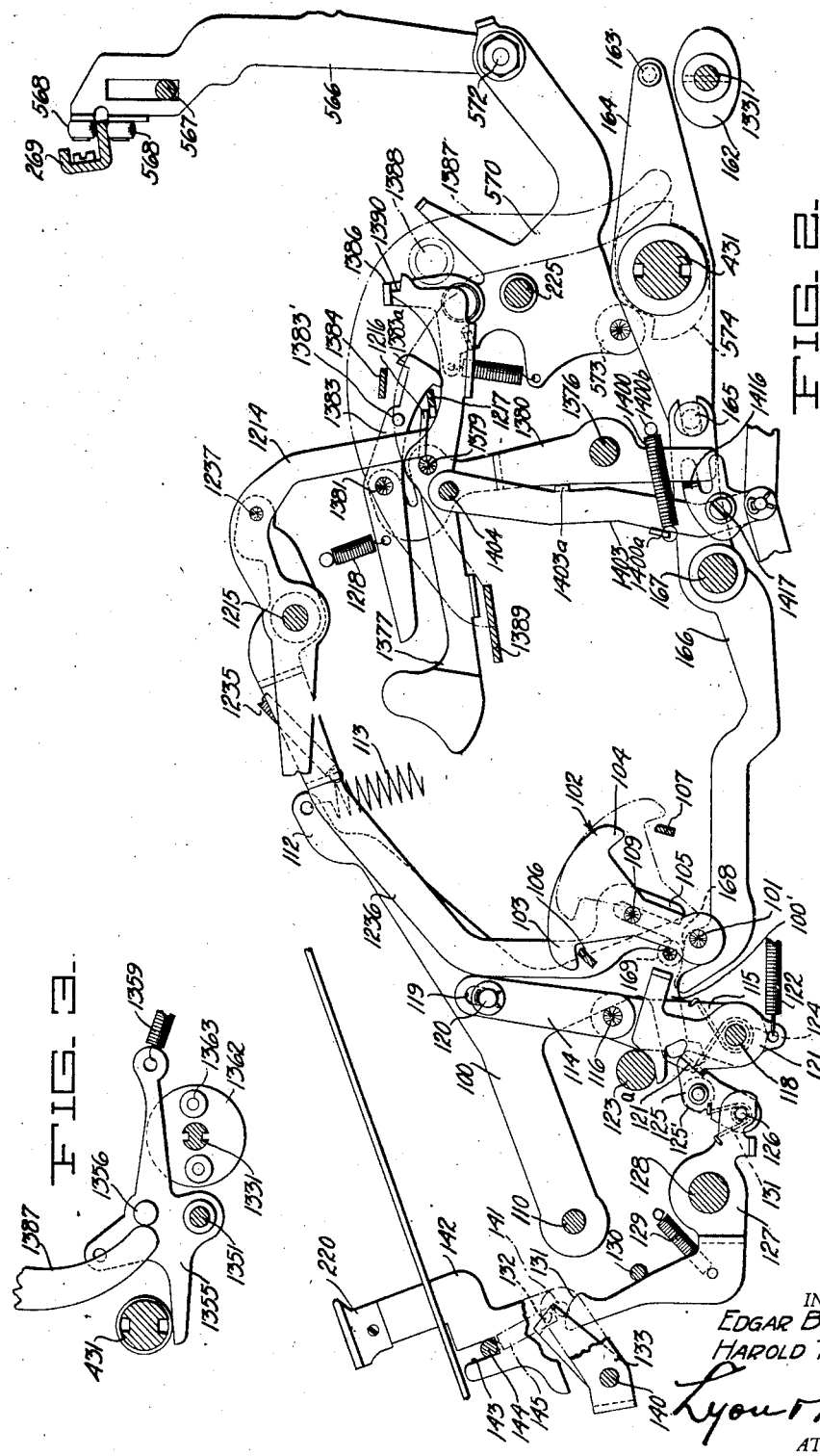

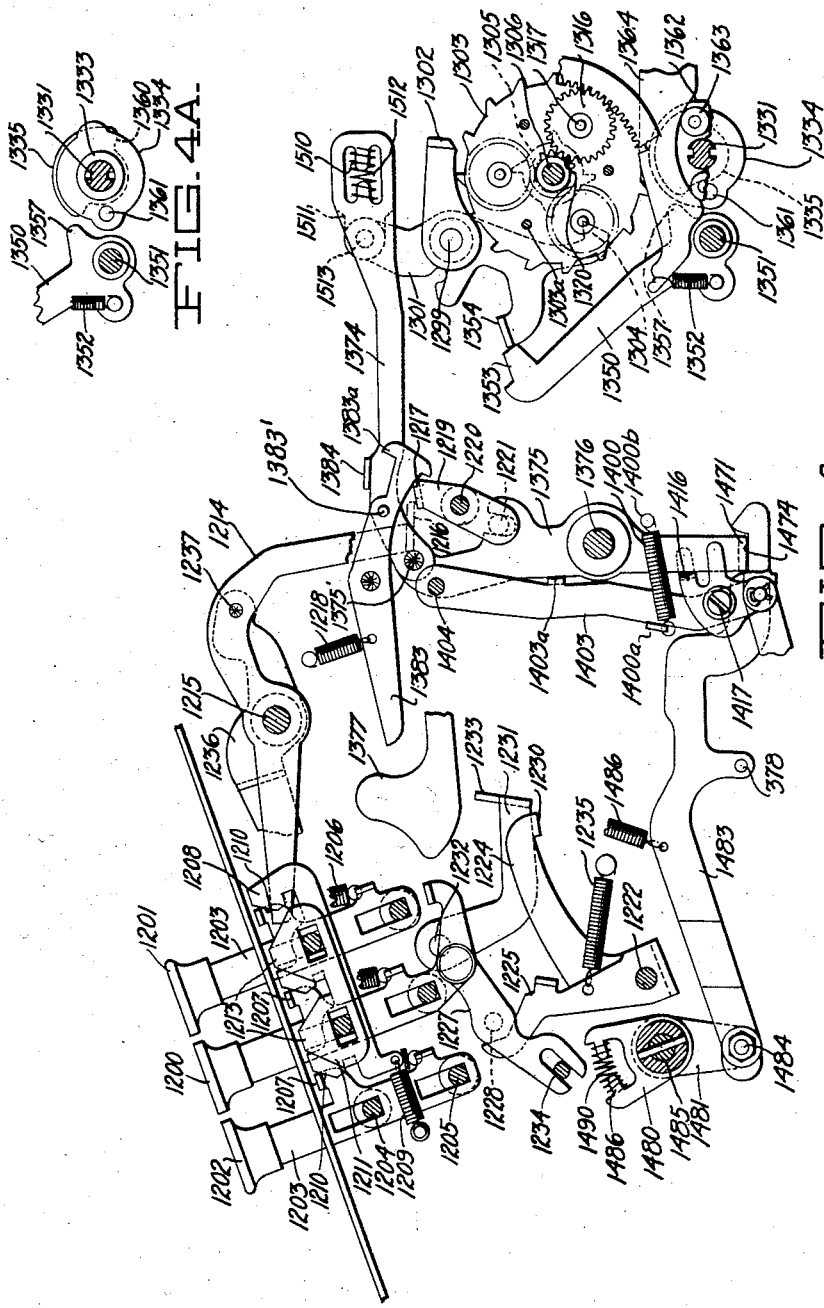

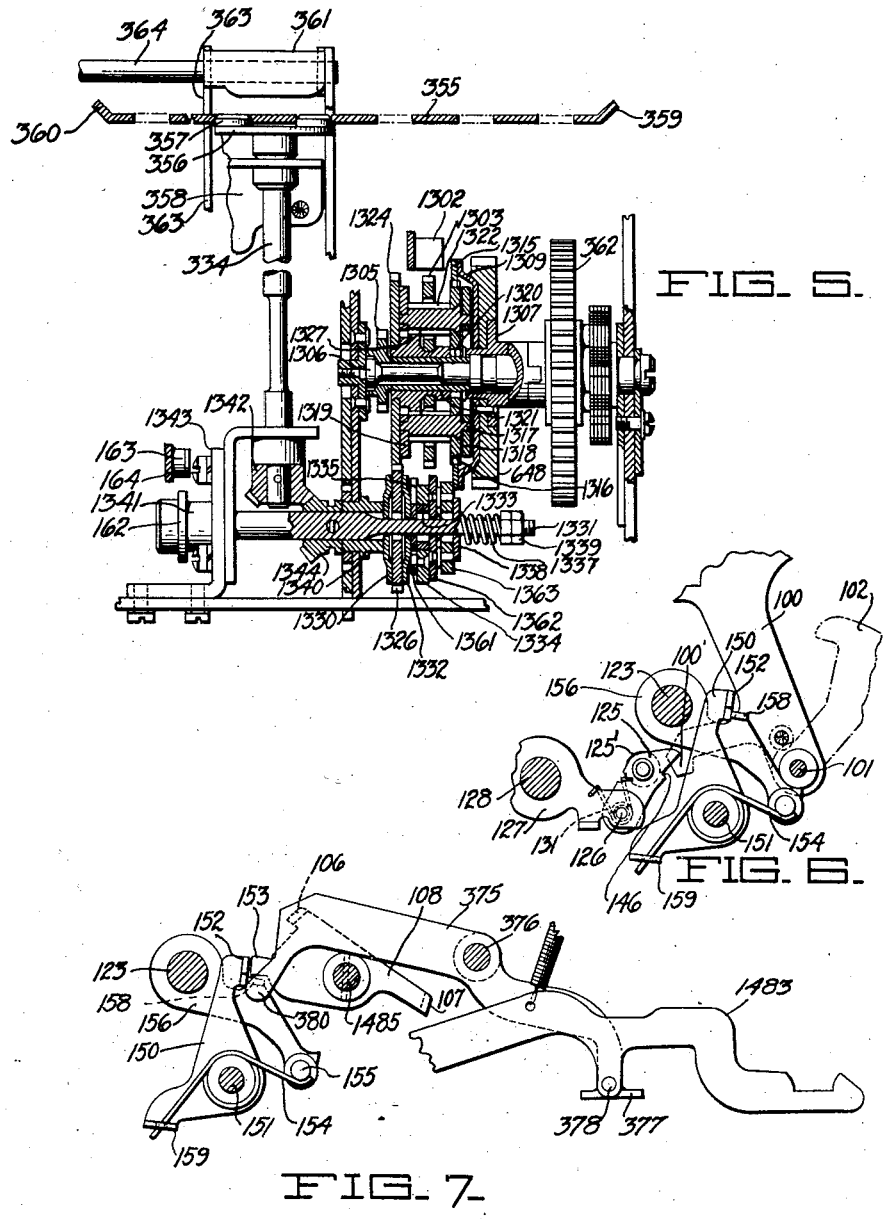

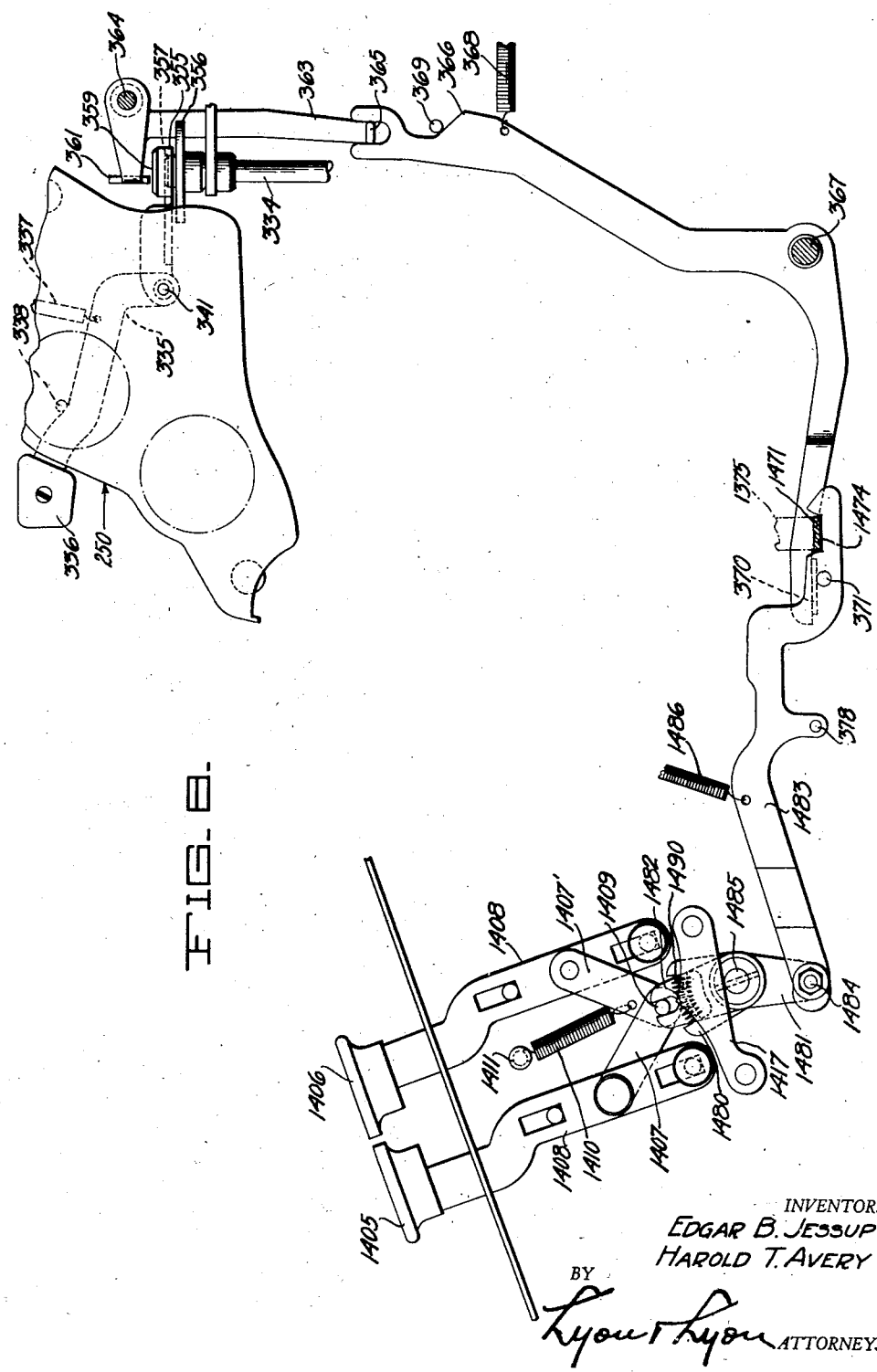

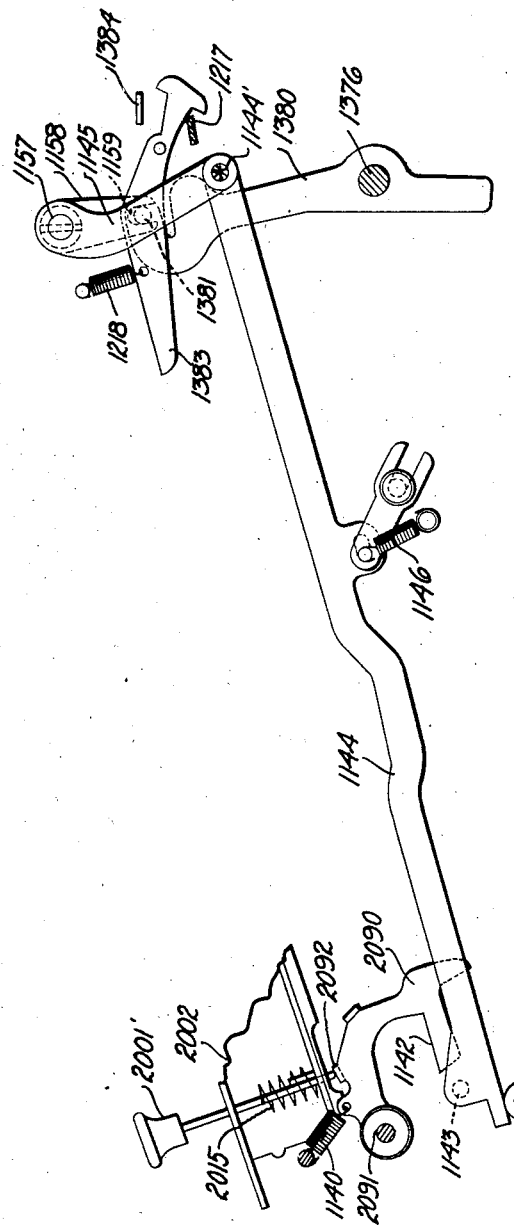

Patented Nov. 30, 1943

2,335,282

UNITED STATES PATENT OFFICE 2,335,282

CALCULATING MACHINE

Edgar B. Jessup, Piedmont, and Harold T. Avery, Oakland, Calif., assignors to Marchant Calculating Machine Company, a corporation of California Application July 6, 1940, Serial No. 344,238

11 Claims. (Cl. 235—63)

Our present invention relates to calculating machines of the type adapted to perform the four cardinal calculations, and has particular reference to the type wherein a transversely shiftable carriage is provided to enable different orders of an accumulator or totalizer to be selectively actuated.

This invention is disclosed as embodied in a machine of the type shown in the patent application of Harold T. Avery entitled "Calculating machines," Serial Number 84,927, filed June 12, 1936, and since matured into Patent Number 2,271,240, issued on January twenty-seventh, 1942 to which reference is hereby made for a disclosure of the complete calculating machine, including mechanism not specifically disclosed herein. It is to be understood, however, that although the invention is illustrated as applied to a machine in which the carriage supports the accumulator and counter registers for transverse movement relative to the actuator mechanism, it is also applicable to a machine in which the accumulator and counter registers are stationary, and the actuating mechanism, or any part thereof, is supported by a suitable carriage.

In calculating machines of the type disclosed in the above patent, a power transmission mechanism is provided whereby the shiftable carriage may be traversed from one position to any other position by power derived from a motor. Control of this carriage-shifting movement is effected by a cyclic clutch forming a part of such power transmission mechanism, the clutch being controlled by manually settable keys or the like to enable the carriage to be selectively shifted in one or the other direction. The control of the carriage shifting movement may also be effected automatically, as during multiplication and division calculations, but that usually necessitates returning the carriage to a starting point before a subsequent calculation involving an automatic carriage shift can be performed.

One object of the present invention is to facilitate shifting the carriage in a machine of this general class into a predetermined position.

Another object of the invention is to enable manually settable means for determining the direction of automatic carriage shift during multiplication calculations or the like, to also control the direction of shift of the carriage during movement thereof to a starting position.

Another object of the invention is to automatically shift a carriage, upon depression of a control key, in a direction opposite to that in which it was automatically shifted during a preceding calculation operation.

A further object of the invention is to shift the carriage (of a machine having automatic carriage shift) in a predetermined direction, upon depression of a master control key, even though the automatic carriage shifting mechanism is disabled to prevent automatic shift during a calculation.

In certain calculating machines, as exemplified in the calculating machine disclosed in the above mentioned application, manually settable keys or the like are provided to determine the direction of automatic shift of a carriage during a multiplication operation. Thus, the carriage shifting mechanism may be arranged to cause the carriage to be shifted to the left from one position to the next when multiplication by one multiplier digit is completed and preparatory to multiplying by a second multiplier digit, or likewise, the carriage shifting mechanism may be arranged to automatically cause the carriage to be shifted to the right at the completion of a multiplication by one multiplier digit. Also, a non-shift key may be provided which, when depressed, will disable such automatic shift entirely.

By means of the present invention, depression of a master carriage return key at the completion of a calculation, or at any other time, will cause the carriage to return to an end or starting position in a direction opposite to that governed by a depressed automatic direction control key, or if a non-shift key is depressed, the carriage will be moved in a predetermined direction to an end position. Thus, the carriage will be conditioned for a subsequent automatic shift in the same direction as before, during a later calculation.

Such return of the carriage to a starting position is made merely by momentarily depressing a master control key, and the operator does not have to go through the mental process of determining which end position the carriage is to be moved into, and does not have to focus his attention upon control of the carriage while it is moving toward that position. He may, therefore, immediately occupy his mind with the next problem and begin to enter the factors of that problem into the keyboard while the carriage is being returned to its starting position.

The manner in which the above and other objects of the invention are accomplished will be readily understood on reference to the following specification when read in conjunction with the accompanying drawings wherein:

Fig. 1 is a plan view of a calculating machine embodying the present invention and showing a shiftable carriage, and control keys for controlling the shift thereof;

Fig. 2 is a longitudinal section, as viewed from the right side of the machine, showing the means for initiating return of the carriage to an end position and also part of the mechanism for automatically effecting a one step shift of the carriage during a multiplication or division calculation;

Fig. 3 is a detailed view of parts of the mechanism for causing the carriage to move one step only during an automatically controlled shift;

Fig. 4 is a longitudinal section, from the right side of the machine, illustrating the shift mechanism and the manually settable means for controlling the direction of automatic shift of the carriage;

Fig. 4a is a detailed sectional view of portions of the apparatus shown in Fig. 4.

Fig. 5 is a detailed sectional view taken transversely of the machine through the planetary shift mechanism and its connection with the carriage;

Figs. 6 and 7 are detailed sectional views, from the right side of the machine, showing portions of the carriage return mechanism;

Fig. 8 is a longitudinal section, as viewed from the right side of the machine, showing the two manually operable shift effecting keys, and the mechanism for arresting shifting movement of the carriage as it reaches an end position; and Fig. 9 is a longitudinal section, viewed from the right side of the machine, illustrating the mechanism under control of a zero multiplier key for effecting a carriage shift.

Power drive for shifting carriage

The controlling mechanism embodying the present invention is designed to control a carriage shifting transmission of the type used in the commercially known "Marchant" calculating machine. The construction and operation of this carriage shifting transmission will therefore be first briefly described before an explanation of the novel controls of the present invention is given.

Fig. 5 discloses a portion of the mechanism of the machine referred to, in which a rack 355 is attached to a carriage 250 (Fig. 8) and is power actuated by rollers 357, to shift the carriage. An electric motor (not shown) supplies the power for effecting the shift, and is connected through suitable shafts and gears to a gear 362 to drive a shift transmission, this gear being rotatably mounted on a shaft 1306 which is positioned between center and right side frames of the machine, as described in the above mentioned Avery patent. A gear 648, used to drive unrelated mechanism, is also rotatably mounted on the shaft 1306 by a flanged sleeve 1307 which is keyed to the hub of the gear 362 and secured by rivets to the gear 648, the same rivets affixing a dished supporting disc 1309 to the gear 648.

An internal ring gear 1315, secured to the supporting disc 1309, meshes with and is adapted to drive three equi-spaced planetary gears 1316 (Figures 4 and 5) securely riveted to each of three shafts 1317, respectively, which extend through clearance holes provided in a ratchet wheel 1303, and are journaled in bearings formed in a pair of spaced end plates 1318 and 1319, the plates and ratchet wheel 1303 being secured together as a rigid unit by studs 1303a (Fig. 4).

The planetary gears 1316 also mesh with a sun gear 1320 formed upon one end of a sleeve 1321, to the opposite end of which is keyed a second ratchet wheel 1305. Gear teeth 1322 are formed on the shaft 1317 and these mesh with a second sun gear 1327 to which is secured a gear 1324, meshing with a gear 1326 rotatably mounted on a shaft 1331. This latter gear is held between a pair of friction discs 1330 and 1332 which are keyed to the shaft 1331, and pressed together by a compression spring 1337.

Interposed between the compression spring 1337 and the friction disc 1332 are: a disc 1335 keyed to the shaft 1331; a sleeve 1333; a second disc 1362 also keyed to the shaft 1331, and supporting a pair of diametrically opposed rollers 1363; and a washer 1338. A pair of lock nuts 1339 are adjustable along the threaded end of shaft 1331 to regulate the amount of friction between the gear 1326 and its friction discs 1330 and 1332.

The shaft 1331 is journaled in bearings 1340 and 1341 and has a beveled gear 1344 secured thereon and meshing with a second bevel gear 1342 fixed on the lower end of a vertical shaft 334. Shaft 334 is journaled in bearings provided in brackets 358 and 1343, and has fixed at the upper end thereof a hub and plate assembly 356 on which are mounted the rollers 357 adapted to engage between the teeth of the rack 355 (Figs. 5 and 8), mounted on the shiftable carriage 250. Thus, upon rotation of the assembly 356 by the planetary transmission mechanism, the rollers 357 engage the rack 355 and shift the carriage 250 laterally either to the right or to the left depending upon the direction of rotation of the shaft 334.

The shaft 1331 may be selectively rotated in either direction to effect a shift of the carriage 250 either to the right or to the left, by holding one or the other of the ratchet wheels 1303 and 1305 from rotation. Holding the ratchet wheel 1303 prevents revolution of the planetary gears 1316 about the sun gear 1320, and the planetary gears then function as idlers to transmit rotation from the driving internal gear 1315 through the integrally connected gears 1322, to the sun gear 1327, whereby the gear 1324 will be rotated in one direction. If, however, the other ratchet wheel 1305 is held, thereby holding stationary the sun gear 1320 integrally attached thereto, the rotation of internal gear 1315 will revolve the planetary gears 1316 about the fixed sun gear 1320 with which they mesh and at the same time force them to rotate on their own centers, to thereby drive the gear 1324 in the opposite direction.

To control the ratchet wheels 1303 and 1305, a clutch member 1301 (Fig. 4) pivoted on a stud 1299 is provided. The member 1301 has a pair of latch dogs 1302 and 1304 extending therefrom, dog 1302 being adapted to engage and hold the ratchet wheel 1303 from rotation when the member 1301 is rocked in a clockwise direction, as viewed in Fig. 4, while the dog 1304 is adapted to engage and hold the ratchet wheel 1305 against rotation when the member 1301 is rocked in a counterclockwise direction. If the clutch member 1301 is held in a neutral position, as illustrated in Fig. 4, wherein neither of the dogs 1302 and 1304 is engaged, the differential merely idles and there is no drive to the shifting mechanism.

Means are provided whereby either of the dogs 1302 and 1304, after initial actuation, is held in engagement with its respective ratchet wheel during approximately the first three quarters of a shift cycle, to positively insure the completion of any initiated shift regardless of how soon the control member 1301 is urged toward its neutral position after having once been moved to shift controlling position. Thus, on a leftward extension of the clutch control member 1301 (Fig. 4) there is a laterally extending ear 1354 adapted to be engaged with either the top or bottom surface of a projection 1353 formed on a latch member 1350, said latch member being pivotally mounted at 1351 and urged toward engagement with the ear 1354 by a spring 1352. When the control member 1301 is rocked either clockwise or counter-clockwise, the projection 1353, which normally rests against the forward edge of ear 1354, will snap into latching position either above or below the ear 1354, under tension of the spring 1352, and thereby latch the clutch member 1301 against return movement into its neutral position until the shift has progressed through approximately three-quarters of its current cycle, at which time it will be released (as will be described presently) unless the member 1301 is still maintained in clutch engaging position by continued depression of one of the keys 1405 and 1406, or otherwise.

Provision is made for additionally tensioning the spring 1352 during a shift cycle to insure positioning of the projection 1353 above or below the ear 1359, and for this purpose a centralizer 1364 (Fig. 4) is utilized, the upper end of spring 1352 being attached to the extreme left hand end thereof. The centralizer 1364 is pivotally supported at its right end (not shown) and is held in engagement with the two diametrically opposed rollers 1363 by the spring 1352. When the shaft 1331 starts to rotate at the beginning of a shift cycle, one of the rollers 1363 carried on the disc 1362, which is keyed to the shaft 1331, cams the centralizer 1364 upwardly, thereby increasing the tension on the spring 1352 and insuring latching engagement of the projection 1353 with the ear 1354 of clutch member 1301.

Provision is made for moving the latch member 1350 out of latching relation with the clutch member 1301 at approximately three-quarter cycle position. For this purpose, a cam 1334 (Figs. 4 and 4A), having a pair of diametrically opposed lobes formed thereon, is rotatably mounted on the sleeve 1333 (Fig. 5) and is driven by the disc 1335 keyed on the shaft 1331, so as to cam a nose 1357 formed on the lower end of the latch member 1350 at the end of approximately three-quarters of the shift cycle. To insure the same cyclic time of operation of the latch member 1350 for reverse rotation of shaft 1331, the disc 1335 is provided with two shoulders 1360 disposed approximately 180° apart so that a pin 1361 secured on the cam 1334 will, upon a clockwise rotation of the shaft 1331, be engaged by the shoulder 1360 on the opposite side of the disc 1335 (Fig. 9) only after the disc has been rotated about three-eighths of a revolution (which is three-quarters of a cycle).

The carriage 250 may be shifted laterally along the machine either (1) under manual control by depression of one of a pair of shift effecting keys 1405 and 1406 (Figs. 1 and 8), (2) automatically during certain calculations by mechanism illustrated in Figs. 2, 3 and 4, or (3) upon depression of a master end return control key 220 (Figs. 1 and 2).

*Manual control with keys 1405 and 1406*

The shift-effecting keys 1405 (Fig. 8) and 1406 are mounted on vertically slidable key stems 1408 which are connected by links 1407 and 1407', respectively, with a common pin 1409. A spring 1410, tensioned between the link 1407' and a pin 1411 suitably fixed to the machine framework, normally urges both of the keys 1405 and 1406 into raised position. Thus, upon depression of the key 1405, the pin 1409 is moved to the right, as viewed in Fig. 8, while depression of key 1406 causes the pin 1409 to be moved to the left. A stationary guide member 1417 guides the pin 1409 and serves as an interlock to prevent either of the keys 1405 or 1406 from being depressed when the other has been depressed. Either right or left hand movement of the pin 1409 is transmitted to a bifurcated arm 1482 secured to a shaft 1485 so as to rock the shaft either clockwise or counter-clockwise.

Disposed adjacent each other upon the shaft 1485 are two similar V-shaped members 1480 and 1481, each of which is provided with two spacing lugs 1486 (Figs. 4 and 8). A compression spring 1490 is interposed between these four lugs so that a rocking movement in either direction may be yieldably transmitted from one of the V-shaped members to the other through the spring 1490. The member 1480 is pinned to the shaft 1485 and is thus rocked by movement of the arm 1482, while the member 1481 is free on the shaft and has a downwardly extending tail which is pivotally connected at 1484 to a link 1483. The link 1483 is provided with a notch 1474 on the right hand end thereof, as viewed in Fig. 8, which, by means of a tension spring 1486 bearing upwardly on the link 1483, is normally held in engagement with a lateral extension 1471 formed on the lower end of a lever 1375. The lever 1375 (Fig. 4) is pivoted on a shaft 1376 and is connected at its upper end by a pin 1375' to a second link 1374. This latter link 1374 has an aperture formed therein in which are two facing lugs 1510. Another link 1511 is juxtaposed to the rear end of link 1374 and has an identical aperture formed therein, also with two facing lugs 1510. A compression spring 1512 is interposed between the four lugs 1510 to yieldably connect the two links 1374 and 1511 together. Link 1511 is pivotally connected at 1513 to an arm extending upwardly from the control member 1301, so that longitudinal movement of link 1374 will cause the clutch member to rock about its shaft 1299 and thereby effect a shifting movement of the carriage 250 in the manner described hereinbefore.

The linkage connecting the keys 1405 and 1406 with the clutch control member 1301 is so arranged that when the key 1405 is depressed the member 1301 will be rocked clockwise, as viewed in Fig. 4, to institute a carriage shift to the right. When the key 1406 is depressed, the member 1301 will be rocked in a counter-clockwise direction to effect a shift of the carriage to the left.

Whenever the link 1374 is unrestrained by the latch member 1350, or by one of the shift keys 1405 and 1406, or by the automatic shift controlling mechanism to be hereinafter described, the clutch control member 1301 is automatically centralized in its neutral position, as illustrated in Fig. 4, by a centralizing lever 1403, which is pivoted on a stud 1404 extending from the machine frame. Lever 1403 has a lug 1403a extending laterally into engagement with the lever 1375 at a point above the shaft 1376, and has an adjustable member 1417 having an offset portion 1416 engaging the lever 1375 at a point below the shaft 1376. A tension spring 1400 is provided between an ear 1400a on the lever, and a stud 1400b fixed to the machine framework, to urge the lever 1403 toward the right and thereby return the clutch member 1301 to centralized position when it is released by the shift control mechanisms and the latch 1350.

Automatic shift

As was stated hereinbefore, the carriage 250 is automatically shifted during certain calculations such as multiplication. The mechanism for effecting such automatic shift is described in detail in the above mentioned Avery patent and only a brief description of it is necessary herein for a thorough understanding of the present invention.

At the beginning of a multiplication operation in which the multiplier digit is a significant digit (the keys 2001 in Fig. 1) with a machine of the type described in the above Avery patent, a certain portion of the carriage 250 (Fig. 8) supporting the accumulator register is dipped to enable the actuating mechanism (not shown herein) to engage and drive the accumulator mechanism. This dipping action is produced by a setting shaft 431 (Fig. 2), which is rotated through 180° in a counter-clockwise direction from the position in which it is shown in Fig. 2, at the start of each new machine calculation, thereby causing cams 574 secured thereon to engage cam follower rollers 573 carried by levers 570, to rock these levers about a supporting shaft 225 and thereby pull a pair of carriage dipping links 566, pivotally connected thereto at 572, downwardly against the action of springs (not shown). The links 566 are slidable along a rod 567 at their upper ends and have provided thereon rollers 568 which engage the top and bottom surfaces of a bail 269 carried by the carriage 250 and connected to the aforesaid dipping portion thereof.

While calculation proceeds in a particular order, the levers 570 and links 566, as well as the accumulator mechanism connected thereto, are held in a depressed position by mechanism (not shown) until near completion of the operation in that particular order, at which time the links 566 and levers 570 are allowed to be returned to their normal illustrated position by powerful springs (not shown).

As the levers 570 are rocked clockwise at the start of a calculation in some particular denominational order of the carriage, an ear 1386, carried by an arm on one of the levers 570, is moved to the right past a shoulder 1390 formed on a lever 1377, which is pivotally mounted at 1379 on a lever 1380, and which is weighted at its leftmost end, as viewed in Fig. 2, so as to urge it in a counter-clockwise direction. Thus, as the levers 570 reach their clockwise positions at the beginning of a machine operation, the weighted lever 1377 snaps the shoulder 1390 thereof into latching engagement with the ear 1386.

When the actuation of the register dials in any one carriage position is completed, the return of the levers 570 and links 566 causes the ear 1386 to engage the shoulder 1390 and move the lever 1377 forward (toward the left as viewed in Fig. 2), thus rocking the lever 1380 about its supporting shaft 1376 against the action of the same centralizing lever 1403 as is used to centralize the above mentioned lever 1375.

This counter-clockwise rocking of lever 1380 carries with it a dog 1383 which is pivoted to the lever 1380 at 1381, and has a pair of oppositely extending shoulders formed on the rearmost end thereof. A tension spring 1218 normally holds dog 1383 in the position shown, in which its lower shoulder is juxtaposed to an ear 1217 (Figs. 2 and 4) formed on a lever 1219. Lever 1219 is pivoted on a stationary pin 1220 and has a pin 1221 mounted on the lower end thereof which extends into an elongated notch formed in the lever 1375. Therefore, when the lever 1377 (Fig. 2) is moved to the left, the lever 1219 (Fig. 4) will rock the lever 1375 clockwise and thereby institute a carriage shift to the right.

To insure only a one step shift of the carriage when controlled by the lever 1377, this lever is rocked into an inoperative position during rotation of the shaft 1331. A lever 1355 (Fig. 3), pivoted on a shaft 1351 and urged clockwise by a spring 1359, is engaged and moved counterclockwise by the rollers 1363 on the aforementioned disc 1362, upon rotation of the shaft 1331. A leftward extension of the lever 1355 normally engages the under surface of the setting clutch shaft 431, to limit the clockwise movement of this lever and therefore control the time at which it is engaged and rocked by one of the rollers 1363. Upon counter-clockwise rocking of the lever 1355, a stud 1356 thereon engages the downwardly extending tail of a bell crank 1387. This bell crank, illustrated in dot and dash lines in Fig. 2, is pivoted on a shaft 1388 and has a shelf 1389 formed on a forward extension thereof. This shelf 1389 underlies the forward portion of lever 1377 and, when the bell crank 1387 is rocked clockwise during the first shift cycle, rocks the lever 1377 clockwise to release its nose 1390 from the extension 1386 of the lever 570. The member 1301 is thus freed from restraint of the lever 1377 and can be centralized at the end of the first shift cycle as was previously explained unless restrained by other shift control mechanism.

Fig. 9 illustrates mechanism under control of a zero multiplier key 2001' (Fig. 1) for effecting a shift of the carriage in a direction determined by the carriage shift direction control keys 1200, 1201 and 1202 (Fig. 4). Since depression of the zero key merely effects a carriage shift from one position to the next and does not cause operation of the setting shaft 431 (Fig. 2) or operation of the actuating mechanism for the register, the carriage shifting mechanism is controlled directly from this zero key 2001'.

The key stem of key 2001' is slidably mounted in upper and lower flanges of a channel shaped key frame 2002 and is normally held in a raised position by a compression spring 2015 compressed between the lower flange of the key frame 2002 and a shoulder formed on the key stem. The lower end of the key stem abuts an ear 2092 formed on a lever 2090 which is secured to a pivotal shaft 2091 and urged upwardly by a tension spring 1140.

Upon clockwise rocking of the lever 2090 by depression of key 2001', an extension 1142 thereon engages a pin 1143 on a link 1144 and moves the link to the left (as viewed in Fig. 9). Link 1144 is pivotally connected at 1144' to an arm 1145 securely pinned to a shaft 1157. An arm 1158 is also pinned to the shaft 1157 and has a slot 1159 formed in the lowermost end thereof, which slot embraces the pin 1381, which pivotally connects the dog 1383 to the lever 1380.

As was stated hereinbefore, the position of the dog 1383 relative to the ears 1217 and 1384 (see also (Fig. 4) is controlled by the three keys 1200, 1201 and 1202. Therefore, depression of the zero key 2001' will impart forward (to the left as viewed in Fig. 9) movement to the link 1144 and consequently to the dog 1383, through the arms 1145 and 1158, to effect a carriage shift in the same direction as that effected by rocking of the lever 570 (Fig. 2).

Mechanism (not shown) is preferably employed for limiting a carriage shift initiated by the depression of the zero key 2001' to a single step, regardless of the length of time the zero key is held depressed. For this purpose, the mechanism illustrated in the above mentioned Avery patent may be employed. This mechanism comprises, in general, means operable by the carriage shifting mechanism during its first cycle of operation for rocking the link 1144 clockwise about its pivot 1144', against the action of a tension spring 1146, until the pin 1143 thereon becomes disengaged from the extension 1142, allowing the centralizer 1403 (Fig. 2) to return the shift mechanism to its neutral position wherein the shifting operation ceases.

*Manual control for direction of automatic shift and non-shift*

During multiplication operations of the machine, which include automatic carriage shift, it may be desirable, because of the preference of the machine operator, or due to the particular sequence of a series of problems, that the shift sometimes be in the left hand direction instead of in the right hand direction, as was described. It is likewise desirable in some instances that the shift be disabled altogether.

In order to control the direction of the automatic shift or to disable the shift entirely, a set of three depressible control keys 1200, 1201 and 1202 (Figs. 1 and 4) are provided. Each of these control keys is mounted on a stem 1203, the three stems being substantially identical with each other and supported for vertical movement on pins 1204 and 1205. Each of the three key stems is provided with a spring 1206 normally urging it into upper position, and each is also provided with a laterally extending arm having an ear 1207.

The above keys are adapted to be latched in a depressed position by a latch member 1208 (Fig. 4) which is slidably supported by the pins 1204 for endwise movement. The latch member has three identical latching noses having inclined edges 1210 formed thereon, adapted to cooperate with the ears 1207 on the respective key stems. Thus, upon depression of any one of the shift control keys, ear 1207 of that key first moves the latch 1208 to the right against the action of a tension spring 1209 until the key reaches its lowermost position, at which time the spring snaps the member 1208 to the left, thereby latching the key in its depressed position. Since depression of any one of the keys will cause the latch member 1208 to be moved to the right, as viewed in Fig. 4, it will release any previously latched key.

In order to prevent two of the keys from being depressed and latched down at the same time, an interlocking plate 1211 is provided. This plate is mounted for free endwise movement on the pins 1204 of the keys 1200 and 1201, adjacent the latch plate 1208. The interlocking plate 1211 is provided with a pair of upwardly extending wedge-shaped projections 1213 which project between the ears 1207 of the three keys. Depression of any one of the keys will cause its respective ear 1207 to engage the inclined surface of one of the projections 1213 and slide the member 1211 to a position wherein it will block the ears of the other two keys, thereby preventing depression of those keys to their lowermost latched down positions.

When it is desired that automatic carriage shift to be to the left, the control key 1201 is depressed into latched position. The ear 1207 of this engages the forward extending tail of a lever 1214 pivoted at 1215 (Figs. 4 and 2) and rocks this lever in a counter-clockwise direction, so that a shelf 1216 formed at its rearmost end engages a pin 1383' on the dog 1383 to raise the dog into such a position that the upper shoulder 1383a thereon is positioned for engagement with an ear 1384 formed directly on the shift controlling link 1374. With the dog 1383 in this position, movement of the link 1377 (Fig. 2) to the left at the completion of a multiplication operation, as was described hereinbefore, will, as before stated, cause the dog 1383 to move to the left, and in doing so it carries the link 1374 to the left to institute a carriage shift in a left hand direction.

Depression of the shift control key 1202 merely causes release of the keys 1200 and 1201 and thereby insures that the lever 1214 may be rocked into a clockwise position by a spring 1235 (Fig. 2) which is connected between a lever 1236 and a portion of the machine frame (not shown). Lever 1236 is secured to the lever 1214 by a pin 1237 thereby forming an integral lever unit. Thus, with key 1202 depressed, the tension spring 1218 is free to move the dog 1383 into the position illustrated in Figs. 2 and 4 in readiness to impart a rightward shift to the shift control link 1374, which results in carriage shifting movement in a right hand direction.

Depression of the non-shift key 1200 causes the automatic carriage shift in either direction to be disabled. As shown in Fig. 4, the key stem 1203 of the non-shift key 1200 is pivotally connected at the lower end thereof to a lever 1227 fulcrumed on a pin 1234. Upon depression of the key 1200 into its latched position, a pin 1228 on the lever 1227 engages a camming surface formed on a lever 1225 and rocks this lever counter-clockwise about a pivot shaft 1222, against the action of a tension spring 1235. The lever 1225 has an arm 1224 extending rearwardly and an ear 1230 on the arm underlies a lever 1231 pivoted at 1232 to the machine frame. As the lever 1225 is cammed in a counter-clockwise direction by depression of the key 1200, the ear 1230 will rock the lever 1231 counter-clockwise, and an extension 1233 formed thereon will engage the left hand end of the weighted lever 1377, thereby rocking this lever into such a position that its shoulder 1390 (Fig. 2) will underlie the ear 1386 on one of the levers 570 and will therefore not be moved thereby when the dipping portion of the carriage 250 is raised at the termination of actuation of the register.

The above described control of automatic shift of the carriage or non-shift thereof is disclosed and claimed in the copending application of Harold T. Avery entitled "Calculating machines," Serial No. 217,993, filed July 7, 1938, and since matured into Patent Number 2,216,659, issued on October first, 1940.

*End return shift under control of key 220*

As was mentioned hereinbefore, one of the main features of the present invention is the provision of means for facilitating return of the carriage to an end position as at the termination of a multiplication operation, whereby the carriage may be easily and quickly prepared for a subsequent calculation.

According to the present invention, movement of the carriage to an end position is accomplished by an end return control key 220 (Figs. 1 and 2). It will be noted that the key 220 is juxtaposed to a "middle dial" clear key 373 and an "upper dial" clear key 1910, the former serving to zeroize, or clear, an accumulator register visible through openings 318 in the carriage 250, while the latter serves to clear a counter register visible through openings 1874 in the carriage 250. Thus, by a single manual stroke, the operator may simultaneously effect clearing of either or both of the two registers and initiate movement of the carriage 250 to either of its two end positions.

Control of the shift is placed under the key 220 through a T member 102 (Fig. 2) which is pivotally connected by means of a pin 101 to the lower end of a starting lever 100. A pin 109 secured to the T member 102 above the pivot pin 101 extends into a slotted portion 105 of the lever 1236. It will be recalled that when the shift control key 1201 (Fig. 4) is in raised position, the combined levers 1214 and 1236 are rocked into clockwise position by the spring 1235, and under these conditions the T member 102 is held in the full line position shown in Fig. 2, wherein an arm 103 thereof overlies an arm 106 formed on a shift operating lever 108 (Fig. 7) which is pinned to the shaft 1485. With the T member 102 in this position, downward movement of the starting lever 100 about its pivot 110, by mechanism to be described presently, causes the T member 102 to rock the shift operating lever 108 in a counter-clockwise direction to turn the shaft 1485 counter-clockwise and thereby (in a manner previously described) effect a carriage shifting movement to the left through the mechanism illustrated in Fig. 4. This direction of carriage travel is opposite to that normally resulting from an automatic shift instituted by the calculating machine mechanism at termination of a multiplication in one order of the carriage, with the key 1202 depressed.

On the other hand, if the direction control key 1201 is depressed, to effect an automatic carriage shift to the left during a multiplication operation, the lever 1236 will be moved counter-clockwise about the shaft 1215 into such a position that the T member 102 is positioned with its rightmost arm 104 overlying the arm 107 of the shift operating lever 108. When the T member 102, while in this position, is moved downwardly by the starting lever 100, the shift operating lever 108 will be rocked clockwise to effect a carriage shift to the right end position. It will be noted that this direction of carriage shift is opposite to that of the automatic shift resulting when key 1201 is depressed.

Since depression of the non-shift key 1200 merely releases the key 1201, it allows the spring 1235 to move the lever 1236 into the position illustrated in Fig. 2. Thereafter, upon institution of a carriage end-return shift operation by depression of the key 220, the carriage will be moved to the left just as though the key 1202 had been depressed.

The actuation of the T member 102 by the starting lever 100 having been described, the operation of lever 100 will now be taken up. Thus lever 100 (Fig. 2) is provided with a rearwardly extending arm 112 which is urged downwardly by a tension spring 113 connected between said arm and the machine frame at a point not shown, but lever 100 is normally held in a raised position, as illustrated in Fig. 2, against the pull of spring 113, (in readiness to effect a carriage end return shifting movement) by a toggle link arrangement comprising a pair of links 114 and 115 pivotally connected together at 116. The lower link 115 is pivoted on a stud 118 extending from the machine frame, while the upper link 114 has an elongated slot 119 therein which embraces a pin 120 provided on the lever 100. An interponent 121 is also pivoted on the stud 118 and is urged in a counter-clockwise direction against a stationary cross rod 123, by a tension spring 122. A torsion spring 124 is wound around the stud 118 and extends between the interponent 121 and the lower link 115 to urge this link counter-clockwise against the cross rod 123. It will be noted that in this position of the toggle link arrangement, the pivot pin 116 is just slightly to the left of center, so that the tension spring 122 also aids in holding the link 115 against the cross rod 123.

The interponent 121 has an ear 121a formed thereon and overlying the forward edge of the lower link 115. A trigger finger 125, pivoted at 126 to a lever 127, is pressed against the ear 121a by a torsion spring 131 interposed between the lever 127 and finger 125. Lever 127 is pivoted on a rod 128 and is held against a limit rod 130 by a tension spring 129. Lever 127 has an upwardly extending arm formed thereon terminating in a camming portion 131 which is adapted to be engaged by an ear 132 formed on a bail 133; in response to clockwise rocking of the latter, to rock the lever 127 counter-clockwise about its pivot shaft 128. Bail 133 is pivoted at 140 and is connected by means of a pin 141 to the key stem 142 of the end return control key 220 for actuation by the latter. This key stem has an elongated slot 143 formed therein which embraces a stationary pin 144 extending from the machine frame to guide the key 220 for linear motion. A tension spring 145 is interposed between the pin 141 and rod 144 to normally maintain the key 220 in raised position.

From the foregoing description it will be seen that upon depression of the key 220, the lever 127 will be rocked counter-clockwise to raise the finger 125 until the shoulder thereon engages the ear 121a and moves the interponent 121 clockwise to break the toggle link arrangement and allow the spring 113 to rock the starting lever 100 about its pivot 110. Thereupon, the T member 102 is caused to rock the shift operating lever 108 and institute a carriage shift movement, as previously described.

An extension 100' (Figs. 2 and 6) is formed on the lower end of starting lever 100, and when the lever 100 approaches its lowermost position under the action of spring 113, the leftmost end of this extension engages a roller 125' fixed to the finger 125 to rock this finger counter-clockwise until its shoulder is disengaged from the ear 121a on interponent 121. Therefore, the spring 122 will overcome the spring 124, but not spring 113, and will rock the interponent back against the cross rod 123.

Upon release of pressure on the end return control key 220, the springs 129 and 145 cause the bail 133, lever 127 and the finger 125 to assume their normal illustrated positions (Fig. 2). However, mechanism is provided to cause the carriage to continue its shifting movement until an end position is reached regardless of whether or not the key 220 is released before the carriage reaches such end position. To this end, a latch member 150 (Fig. 7) is provided to latch the shift control lever 108 in shift controlling position. This member 150 is pivoted on a stud 151 secured to the machine frame and has a latching ear 152 formed on an upward extension thereof, which ear is adapted to engage either the top or the bottom surface of a projection 153 on the shift operating lever 108, depending upon which position the lever is moved into by the T member 102. A torsion spring 154 is provided to urge the member 150 toward latching engagement with the lever 108. Spring 154 extends between a lug 159 on latch member 150 and a roller 155 provided on the lower end of a lever 156 pivoted on the cross rod 123. While the lever 100 is above its lowermost position, the lever 156 is held in a raised position, as illustrated in Figs. 6 and 7, by the spring 154, in which position a lug 158 formed thereon extends in front of the ear 152 on latch member 150, thereby preventing engagement of the ear 152 with the projection 153 on lever 108. Thus, the latch member 150 is prevented from latching the arm 108 in a set position during control of the carriage shift by the depression of one of the keys 1405 and 1406, or at any time except during a shift initiated by the tabulator controls.

As the starting lever 100 moves downwardly after being tripped by the key 220, an enlarged portion of the pin 101 (Fig. 2) engages the lower end of the lever 156 (Fig. 7) and rocks this lever clockwise to remove the ear 158 from blocking engagement with the ear 152 on member 150. This rocking movement of lever 156 also serves to further tension the torsion spring 154 and enables it to easily move the lever 150 into latching relation with the projection 153.

The starting lever 100 is automatically recocked during the first shift cycle, and, for this purpose, levers are provided which are operated by a cam 162 (Figs. 2 and 5) secured on the shift drive shaft 1331. As the cam 162 is rotated during a shift cycle, it engages a cam follower roller 163 mounted on a lever 164 to rock this lever in a counter-clockwise direction about the setting shaft 431 on which it is freely mounted. Lever 164 transmits a rocking movement to a second lever 166 through a pin and slot connection 165, thereby rocking this lever 166 in a clockwise direction about a stationary rod 167, causing a camming edge 168 formed on its foremost end to engage a roller 169 riveted to the lower end of the lever 100, and thereby raising this lever upwardly.

The height of the cam 162 is purposely of such magnitude that the starting lever 100 will be substantially over-cocked, the elongated slot 119 in the upper link 114 allowing such movement, to permit the toggle links 114 and 115 to be returned to their position shown in Fig. 2 by the torsion spring 124, before the starting lever 100 is allowed to drop into its latched position.

*Carriage end return arresting mechanism*

After movement of the carriage 250 toward either of its two end positions has been initiated by the key 220, it will continue through the shifting movement until it reaches the end position. Means are provided to stop the carriage in its end position and to cause the various parts of the carriage end return mechanism to assume their normal illustrated positions.

Referring to Figs. 5 and 8, the carriage shift rack 355 may be disengaged from the drive rollers 357 to enable free traverse of the carriage by hand or to prevent damage to the parts whenever the carriage reaches an end position under power and the shift mechanism continues on. To effect such disengagement of the rack 355, it is supported for rocking movement about a cross rod 341 (Fig. 8) which is mounted on plates of the carriage. Thus, a lever 335 is suitably secured to the rack 355, is fulcrumed on the rod 341, and extends forwardly through the carriage cover, where it terminates in a handle 336. When handle 336 is manually depressed it lifts the rack clear of the drive rollers 357. The rack is, however, normally held in meshing relation with the rollers 357 by a tension spring 337 connected between a portion of the carriage frame and the lever 335 to hold the latter against a stop 338. In this manner the carriage may be freed from the shift mechanism and moved to any desired lateral position, and if the operator should stop the carriage out of an operating position, the teeth of the rack will merely rest on top of one of the rollers 357, where it will remain until the shaft 334 is rotated in an attempt to shift the carriage. When this takes place, one of the rollers 357, while being revolved about the axis of the shaft 334 will become aligned with a tooth space, thereby allowing the rack to be moved downwardly into meshing engagement by the spring 337, and during the ensuing shift cycle the carriage will be traversed in the regular manner.

The shift rack 355 is provided with spaces corresponding in number to the number of carriage positions, and has formed on either end thereof upwardly bent deflector lugs 359 and 360. As the carriage approaches one of its end positions, one or the other of the lugs 359 and 360, depending upon the direction of carriage travel, will be moved to a position underlying, but not touching, a bail 361 pivotally supported on a cross rod 364. After the carriage has reached its end position, continued rotation of the shaft 334 will cause one of the rollers 357 to underride the juxtaposed deflector lug 359 or 360 and thereby rock the rack 355 upward out of meshing engagement with the rollers. This rocking movement will also cause the lug to engage the bail 361 and rock it about the shaft 364, thereby causing a depending arm 363 (Fig. 8) of the bail 361 to be rocked in a clockwise direction. An ear 365 formed on the lower end of this arm engages the upper bifurcated end of a lever 366, which is pivoted at 367 and normally urged in a clockwise direction against a pin 369 by a tension spring 368. A forwardly extending arm of the lever 366 has an ear 370 formed thereon which overlies a pin 371 extending from the shift operating link 1483 described hereinbefore. Thus, as the lever 366 is rocked by the arm 363, the link 1483 will be dipped about its pivot 1484 until the notch 1474 formed thereon no longer embraces the ear 1471 of the lever 1375 (Figs. 4 and 8). Thereupon, the centralizer 1403 will exert a force on the shift controlling mechanism tending to move it into neutral position.

However, even after the shift control mechanism has thus been released from control by the link 1483, the latch dog 1350 will maintain the shift mechanism in operation until the end of the current shift cycle, although the carriage is not shifted during this last cycle. Therefore, the rollers 357 will be revolved to such a position that one of them will again be aligned with a tooth space in the rack 355, allowing the rack to drop into meshing engagement with the roller, and permitting the springs 368 and 1486 to return the lever 366 and link 1483 to their normal positions.

Means are provided for releasing the latch 150 (Fig. 6) during the last or false shift cycle. For this purpose, a lever 375 (Fig. 7) pivoted on a bearing pin 376 is provided. A lug 377 on the lower end of the lever 375 underlies a pin 378 on the link 1483, so that as this link is rocked downwardly by the lever 366 during the last shift cycle, the lever 375 will be rocked clockwise, and a camming nose 380 formed thereon will engage the latching ear 152 of the latch member 150 to rock the latter outwardly away from latching engagement with the projection 153 on the shift operating lever 108, enabling this lever to be centralized. As the latch member 150 is rocked by the camming nose 380 of lever 375, the ear 152 will pass over the ear 158 of the lever 156, enabling the torsion spring 154 to rock lever 156 upwardly, causing the ear 158 to hold the latch member 150 in unlatched position.

In accordance with the hereinbefore mentioned alternative uses of a movable carriage, it is to be understood that the term "carriage," as used in the appended claims, is not to be limited to a carriage for supporting accumulator and similar registering mechanisms, but is intended to include a carriage or device of that nature for supporting actuators or other mechanism for movement into different positions.

We claim:

1. In a calculating machine, a transversely shiftable carriage, reversible motive means for shifting said carriage in either direction, first means for initiating operation of said carriage shifting means, second means operable independently of said first means for also initiating operation of said carriage shifting means, manually settable means for selectively controlling the direction of operation of said carriage shifting means upon initiation of operation thereof by said first means, and means responsive to setting of said manually settable means and to operation of said second means for initiating operation of said carriage shifting means in a direction opposite to that effected by said first means for the same setting of said settable means.

2. In a calculating machine, a transversely shiftable carriage, motive means for shifting said carriage, means operable automatically as an incident to a calculating operation by the machine for initiating operation of said carriage shifting means, manually controlled means for controlling initiation of operation of said carriage shifting means independently of said automatic means, selectively settable means for determining the direction of operation of said carriage shifting means upon initiation of operation thereof by said automatic means, and means responsive to said settable means and said manually controlled means for controlling said carriage shifting means to shift said carriage in a direction opposite to said determined direction upon initiation of operation thereof by said manually controlled means while said settable means has the same setting.

3. In a calculating machine having a transversely shiftable carriage, motive means for shifting said carriage, and means operable automatically as an incident to a calculating operation by the machine for initiating operation of said carriage shifting means, the combination of: manually controlled means for controlling initiation of operation of said carriage shifting means independently of said automatic means, means comprising selectively depressible direction control keys for selectively determining the direction of operation of said carriage shifting means upon initiation of operation thereof by said automatic means, and means controlled by a depressed one of said keys and rendered effective by said manually controlled means for determining the direction of operation of said carriage shifting means in a direction opposite to that determined by said depressed key when operation is initiated by said automatic means.

4. In a calculating machine having a transversely shiftable carriage, motive means for shifting said carriage, and means operable automatically as an incident to a calculating operation by the machine for initiating operation of said carriage shifting means, the combination of: manually controlled means for controlling initiation of operation of said carriage shifting means independently of said automatic means, selectively settable means for selectively conditioning said carriage shifting means for operation in a selected direction upon initiation of operation thereof by said automatic means, selectively settable means for preventing initiation of operation of said carriage shifting means by said automatic means, and means jointly controlled by said first mentioned selectively settable means and said manually controlled means for conditioning said carriage shifting means for operation in the opposite direction upon actuation of said manually controlled means with said first mentioned selectively settable means unchanged, said jointly controlled means conditioning said carriage shifting means for operation in a fixed predetermined direction in response to setting of said last mentioned selectively settable means.

5. In a calculating machine a transversely shiftable carriage; motive means selectively operable to shift said carriage in either direction; starting means operable automatically as an incident to a calculating operation by the machine; manually controlled starting means; means selectively settable into any one of three different settings to selectively condition said carriage shifting means for operation in one direction, operation in the other direction, and no operation, respectively, in response to operation of said automatic starting means; and means controlled by said selectively settable means for conditioning said carriage shifting means for operation initiated by said manually controlled means, whereby said carriage is shifted in direction opposite to that initiated by said automatic starting means when the settable means is in said first or said second setting respectively, and in a fixed predetermined direction when the settable means is in its said third setting.

6. In a calculating machine having a transversely shiftable carriage and motive means for shifting said carriage, two shift controlling mechanisms for said carriage shifting means, a manually settable device, means controlled by said device for selectively conditioning one of said shift controlling mechanisms to control the operation of said carriage shifting means in one selected direction, and means controlled by said device for conditioning the other of said shift controlling mechanisms to control the operation of said carriage shifting means in the opposite direction.

7. In a calculating machine having a transversely shiftable carriage and motive means for shifting said carriage, two shift controlling mechanisms for said carriage shifting means, manually settable means for selectively preparing one of said shift controlling mechanisms to control the operation of said carriage shifting means in one direction and for preparing the other of said shift controlling mechanisms to control the operation of said carriage shifting means in the opposite direction, latching means operable to maintain said carriage shifting means in operation, means for preventing operation of said latching means upon operation of said carriage shifting means under control of one of said shift controlling mechanisms, means controlled by the other of said mechanisms for disabling said preventing means, and means operable under control of said other mechanism for again enabling said preventing means for operation in a fixed predetermined shifting operation.

8. In a calculating machine having a transversely shiftable carriage and motive means for shifting said carriage, two shift controlling mechanisms for said carriage shifting means, manually settable means for selectively preparing one of said shift controlling mechanisms to control the operation of said carriage shifting means in one direction and for preparing the other of said shift controlling mechanisms to control the operation of said carriage shifting means in the opposite direction, latching means operable to maintain said carriage shifting means in operation, means for preventing operation of said latching means upon operation of said carriage shifting means under control of one of said mechanisms, means controlled by the other of said mechanisms for disabling said preventing means, and means operable under control of said other mechanism for again enabling said preventing means with said carriage in one of said end positions.

9. In a calculating machine having a transversely shiftable carriage and motive means for shifting said carriage, two shift controlling mechanisms for said carriage shifting means, manually settable means for selectively preparing one of said shift controlling mechanisms to effect operation of said carriage shifting means in one direction and for preparing the other of said shift controlling mechanisms to effect the operation of said carriage shifting means in the opposite direction, and manually settable means for disabling one of said shift controlling mechanisms and for controlling said first-mentioned manually settable means to prepare the other of said shift controlling mechanisms to control the operation of said carriage shifting means in a predetermined direction.

10. In a calculating machine, a transversely shiftable carriage, reversible motive means for shifting said carriage in either direction, first means for initiating operation of said carriage shifting means, second means operable independently of said first means for also initiating operation of said carriage shifting means, manually settable and releasable means for selectively controlling the direction of operation of said carriage shifting means upon initiation of operation thereof by said first means, means responsive to setting of said manually settable means and to operation of said second means for initiating operation of said carriage shifting means in a direction opposite to that effected by said first means for the same setting of said settable means, and means responsive to release of said manually settable means for conditioning said carriage shifting means for operation in a fixed predetermined direction upon initiation of operation thereof.

11. In a calculating machine having a transversely shiftable carriage, and motive means for shifting said carriage; two shift controlling mechanisms for said carriage shifting means, manually settable means for selectively preparing one of said shift controlling mechanisms to effect operation of said carriage shifting means in one direction and for preparing the other of said shift controlling mechanisms to effect the operation of said carriage shifting means in the opposite direction, second manually settable means for disabling one of said shift controlling mechanisms, means controlled by said second manually settable means for releasing said first manually settable means from set position, and means responsive to release of said first-mentioned manually settable means from set position for preparing the other of said shift controlling mechanisms to control the operation of said carriage shifting means in a predetermined direction.

EDGAR B. JESSUP.
HAROLD T. AVERY.